July 4, 1933.  A. CAMPBELL  1,916,560

LOAD DISCHARGING CAR

Filed Oct. 15, 1931   8 Sheets-Sheet 1

INVENTOR.
ARGYLE CAMPBELL
BY George I. Haight
ATTORNEY.

July 4, 1933.  A. CAMPBELL  1,916,560
LOAD DISCHARGING CAR
Filed Oct. 15, 1931   8 Sheets-Sheet 3

INVENTOR.
ARGYLE CAMPBELL
BY George D. Haight
ATTORNEY.

July 4, 1933.  A. CAMPBELL  1,916,560
LOAD DISCHARGING CAR
Filed Oct. 15, 1931  8 Sheets-Sheet 4

Fig. 8

INVENTOR.
ARGYLE CAMPBELL
BY George D. Hight
ATTORNEY

July 4, 1933.  A. CAMPBELL  1,916,560
LOAD DISCHARGING CAR
Filed Oct. 15, 1931   8 Sheets-Sheet 5

INVENTOR.
ARGYLE CAMPBELL
BY
ATTORNEY

July 4, 1933.   A. CAMPBELL   1,916,560
LOAD DISCHARGING CAR
Filed Oct. 15, 1931   8 Sheets-Sheet 7

INVENTOR.
ARGYLE CAMPBELL
BY George D. Haight
ATTORNEY.

Patented July 4, 1933

1,916,560

UNITED STATES PATENT OFFICE

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS

LOAD DISCHARGING CAR

Application filed October 15, 1931. Serial No. 568,998.

My invention relates to improvements in load discharging cars.

An object of my invention is to provide improved bracing and supporting means for a pivotally mounted discharge door whereby continuity of reinforcement will be effected between the hinged edge of the door and the car frame structure adjacent the swinging edge of said door, and the parts of the door supporting mechanism and the door bracing will be relieved of undue strains.

Another object of my invention is to provide improved means for supporting a discharge door from the lower portion of a car side wall member whereby bending strains on the door operating means will be reduced to a minimum and whereby the parts included in the door bracing supporting mechanism may be formed of comparatively light weight sections.

Another and more specific object of the invention is to provide an improved cast metal integral door bracing member extending from the hinged edge of the door to the door supporting mechanism.

Another and still more specific object of my invention is to provide an improved hinge brace construction such as will have means for cooperating with other portions of the door framing to provide a simplified and strong structure with the minimum number of parts.

My improvements further contemplate a construction whereby a door operating shaft may be spaced adjacent the extreme outer edge of the door and have movement in the plane of adjacent portions of the car structure without the necessity of cutting out said car members or weakening the mechanism parts. In cars of the identified construction wherein doors have been raised by means of an operating shaft adjacent the swinging edge of the door, it has been the general practice to operate such doors in units composed of a plurality of doors, thereby necessitating the passage of the operating shaft through the underframe members or else it has been necessary to dispose said operating shaft beyond said parts of the underframe and consequently making it necessary to provide large and cumbersome door braces or extensions from the door to span the distance from the free edge of the door to the operating shaft, and my improvements therefore contemplate a construction wherein the operating means may be mounted on the car structure independently of the transverse members of the underframe.

My invention further resides in certain improvements in construction and details of parts such as will be hereinafter more fully pointed out and claimed.

For further comprehension of my invention, reference may be had to the accompanying drawings wherein my improvements are shown as applied to a so-called gondola car of the type having doors mounted adjacent the longitudinal center of the car and extending towards the sides thereof where said doors are movably supported adjacent their free edges.

Figure 1:
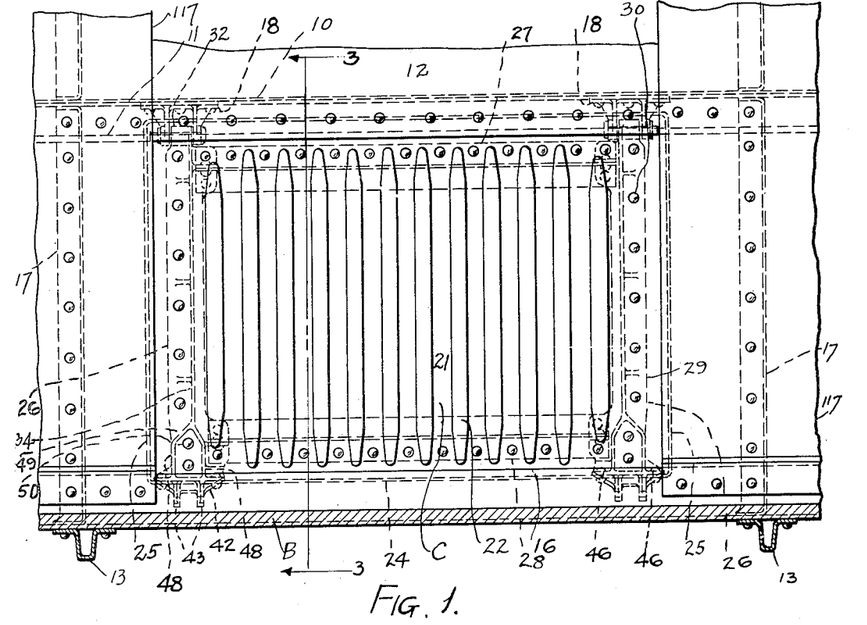
Fig. 1 shows a plan view of a portion of a car showing one door and the car construction identified therewith.
Figure 2:
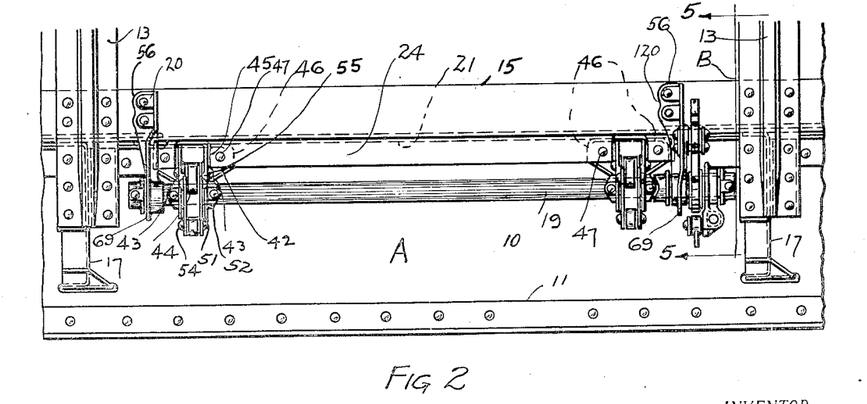
Fig. 2 is a vertical longitudinal elevational view, illustrating so much of that portion of the car shown in Fig. 1 as includes the door operating mechanism and construction identified therewith.
Figures 3, 4, 5:
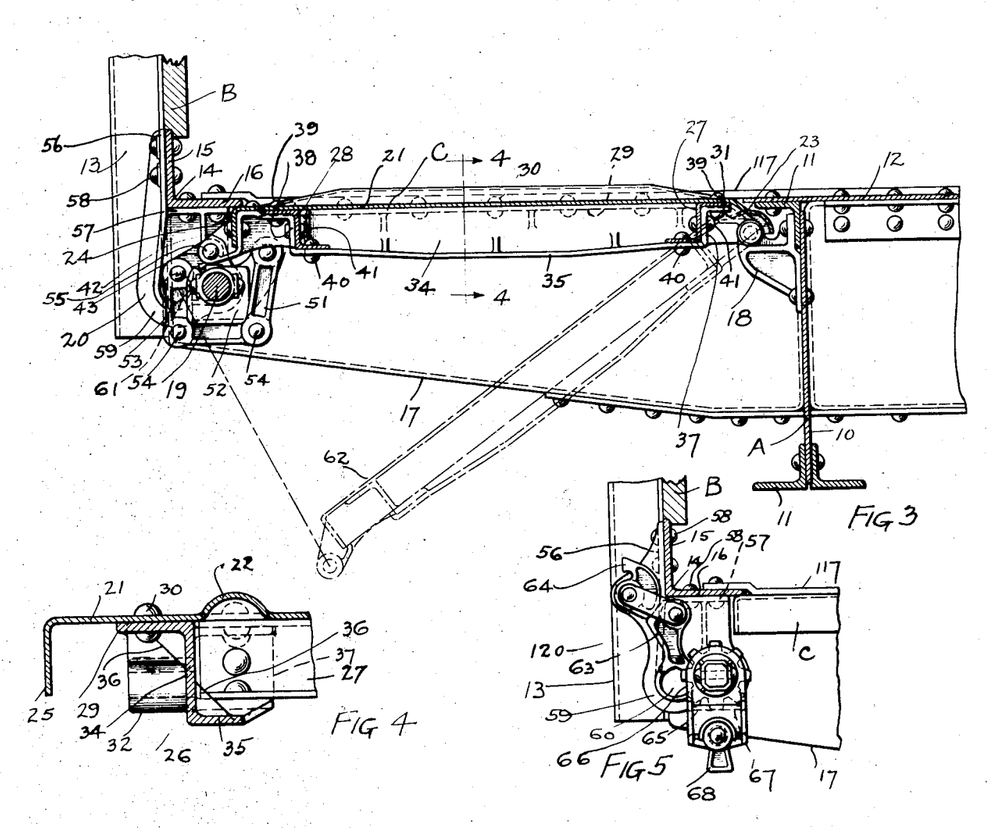
Fig. 3 is a transverse vertical elevational view taken through Fig. 1 on a line corresponding substantially to a line 3—3.
Fig. 4 is an enlarged fractional vertical sectional view taken through the door adjacent one edge and corresponding substantially to a line 4—4 of Fig. 3.
Fig. 5 is a fractional vertical sectional view taken through the outer end of the car on a line 5—5 of Fig. 2.

Referring first to the embodiment shown in Figs. 1 to 5, inclusive:

The car is shown as including a longitudinal center-sill construction A having a vertical web member 10 and upper and lower marginal reinforcing members 11—11 and a surmounting top cover plate 12, and a side wall construction B having side stakes 13, and at the lower portion of the side an angular member 14 including a vertically disposed flange 15 and a lower inwardly extending marginal flange 16. Extending transversely of the car from the cross beam to the centersill is a pair of cross beam members 17—17 having a top cover plate 117, the latter extending transversely of the car above the centersill and into overlapping relation with the outstanding flange 16 of the side wall bottom member. The centersill top cover plate 12, cross beam top cover plates 117—117 of the pair of cross beams, and outstanding flange 16 of the side wall lower member cooperate to define a discharge opening adapted to be closed by a discharge door C.

The door C is mounted adjacent the inner edge thereof on hingebutt brackets 18 carried by and secured to the centersill, and the door adjacent its swinging edge is adapted to be movably supported by means of a bodily movable supporting shaft 19. The shaft is movably supported in slotted bearing brackets 20 and 120. The door C is preferably formed of a sheet metal plate 21 having a series of rigidifying corrugations 22 embossed therein upwardly above the level of the door surface and preferably extending in a direction at an angle to the hinge axis of the door and operating to strengthen the door between the hinge support and door mechanism. The sheet metal plate 21 at its rear, front and respective side margins is flanged downwardly, as indicated at 23, 24 and 25 respectively, thereby presenting a pan-shaped structure. The door on its under side is rigidified by a supporting framework including a pair of integral hinge bracing members 26—26, each extending as an integral unit between the supporting hinge brackets 18 and the door operating shaft, said pair of hinge braces 26—26 in cooperation with front and rear braces indicated at 27 and 28 respectively, constituting a substantially rectangular framework adapted to reinforce the door both longitudinally and transversely. Each hinge brace 26, which is preferably formed of cast steel, is provided with an attaching flange 29 which underlies and is rigidly secured to the door by rivets 30. The brace extends from the front edge to the rear edge of the door and conforms substantially to the shape of the door, being flared downwardly at the rear edge as indicated at 31 to form a support for the downwardly turned rear marginal flange 23 of the door plate. The hinge bracket 18 is extended upwardly within the pan-shaped door structure to receive the hinge portion 32 formed integrally with the said door brace.

Each hinge brace 26, Fig. 4, may be of any suitable cross sectional shape to provide the necessary strength, but preferably includes a depending web 34 which may be suitably reinforced adjacent its lower margin by an outstanding flange as indicated at 35 whereby a Z-shaped section is obtained. The web 34 is braced to the respective upper and lower flanges 29 and 35 by suitable integral bracket portions 36. The said braces adjacent the central portions thereof may be of somewhat deeper construction than the end portions thereof in order to provide a fishbelly construction to obtain increased strength at the location of greatest bending moment. Adjacent the respective rear and front braces 27 and 28, the hinge beams are each formed with integral outstanding bracket portions 37 and 38 which extend around and conform substantially to the shape of the said Z-shaped members 27 and 28 and are secured thereto by rivets 39, 40 and 41 which respectively make connection with the upper and lower flanges and with the web of the said members 27 and 28 thereby providing for continuity of reinforcement around the door adjacent the marginal edges thereof. Each of said hinge beams is extended outwardly beyond the front marginal flange 24 of the door and is there provided with a bracket portion 42 which includes a pair of spaced walls 43—43 between which a door connection 44 is adapted to extend in a manner as will be hereinafter described. In order to permit of the passage of the bracket 42 across the flange 24 of the door, said flange 24 is formed with a cut-away portion 45, and the beam 26 is provided on each side of said cutaway portion with laterally extending wall portions 46—46 which are adapted to be riveted or otherwise secured to the front flange 24 by rivets 47—47, thereby providing continuity of reinforcement for the said marginal flange 24 of the door.

Rearwardly of the extended bracket portion 42 the vertical web section 34 of the door hinge beam is diverted into two walls 48—48 which are respectively disposed substantially in alignment with the respective walls 43—43 and which thus present an opening within which the upwardly extending portion of the door connection 44 previously referred to is adapted to extend when the door is closed and the door mechanism in operative position beneath the door in a manner as will be hereinafter described.

The pair of walls 48—48 connect with the main web 34 by means of inclined walls 49—49. The hinge beam intermediate the walls 48—48 is secured to the body of the door by rivets 50 which are disposed substantially in alignment with the door connection 44 of the door mechanism.

Each door connection 44 consists of a plurality of links 51 adapted to wind around a hub 52 having a number of faces corresponding in number to the number of the links, said hub 52 being rigidly united with the shaft 19 by a plurality of rivets 53. The links are flexibly united together by rivets 54 and said connection is united with the door by being extended between the walls 43—43 of the hinge beam and connected therewith by means of a rivet 55 which extends through the said spaced walls and through the connection. With the door in closed position, as illustrated in Fig. 3, the load is transmitted directly from the door to the operating shaft through the medium of the hinge beams resting upon the hubs 52, and the strain from the shaft to the car is in turn transmitted through the medium of the shaft supporting brackets 20 and 120 which are respectively disposed adjacent the respective side edges of the door and adjacent to the respective connections 44—44. The brackets 20 and 120 are secured to the lower member of the side wall, each bracket being provided with angularly related walls 56 and 57 which respectively overlie the walls 15 and 16 of said lower side wall member 14 and are secured thereto by rivets 58. Each said bearing is provided with a downwardly extending web portion 59 formed with an elongated slot 60. The slot has a depressed portion 61 at the outer end into which the shaft is moved for permitting the door to pass the shaft and open, and for supporting the door in the open position indicated in Fig. 3 by conventional dotted lines 62. The bearing 120 is provided with pawl and dog means as indicated at 63 and 64 respectively, said pawl being adapted to have cooperable engagement with a toothed ratchet wheel 65, the latter being fixedly mounted upon the shaft and adapted to be engaged by the pawl to prevent rotary movement of the shaft in a reverse direction during the raising of the doors and also for locking the door in fully closed position when the shaft is in operative position beneath the door. Rotation of the shaft is effected by means of a pivotally mounted handle 66, said handle having a lever receiving socket 67 formed integrally therewith. On one side of said lever there is disposed a pivotally mounted pawl 68 adapted for cooperating engagement with the under side of the ratchet wheel 65 for rotating the shaft in either direction. During the movement of the shaft from locking to unlocking position it will be noted that said shaft extends beyond the cross beams and into the plane of the side stake members 13 thereby providing for the attainment of large door opening while still maintaining the door operating mechanism parts within the limits of the road clearance.

Figure 6:
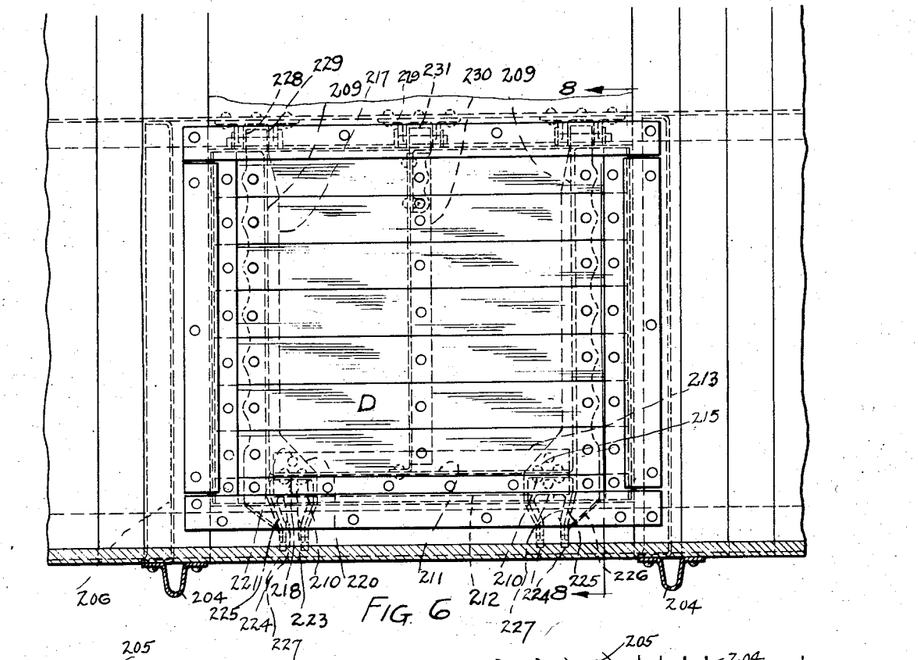
Fig. 6 is an alternate construction showing a plan view similar to Fig. 1 of a portion of a car having a wooden floor and a composite door, and showing my improved construction applied thereto, said view illustrating a portion of the car showing one door and the related car construction.
Figure 7:
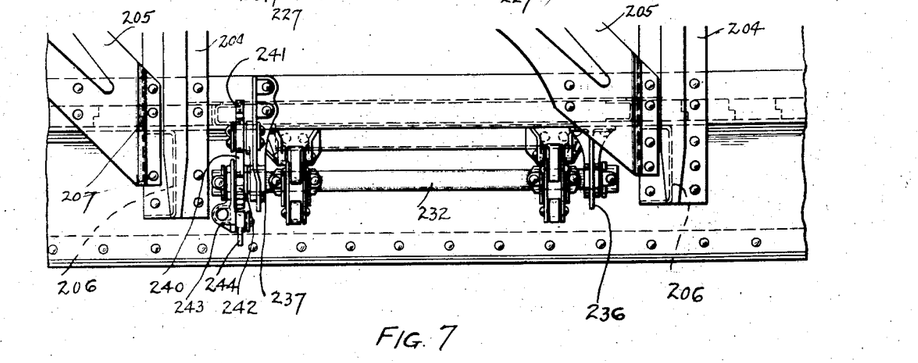
Fig. 7 is a vertical longitudinal elevational view of that portion of the car illustrated in Fig. 6.
Figure 8:
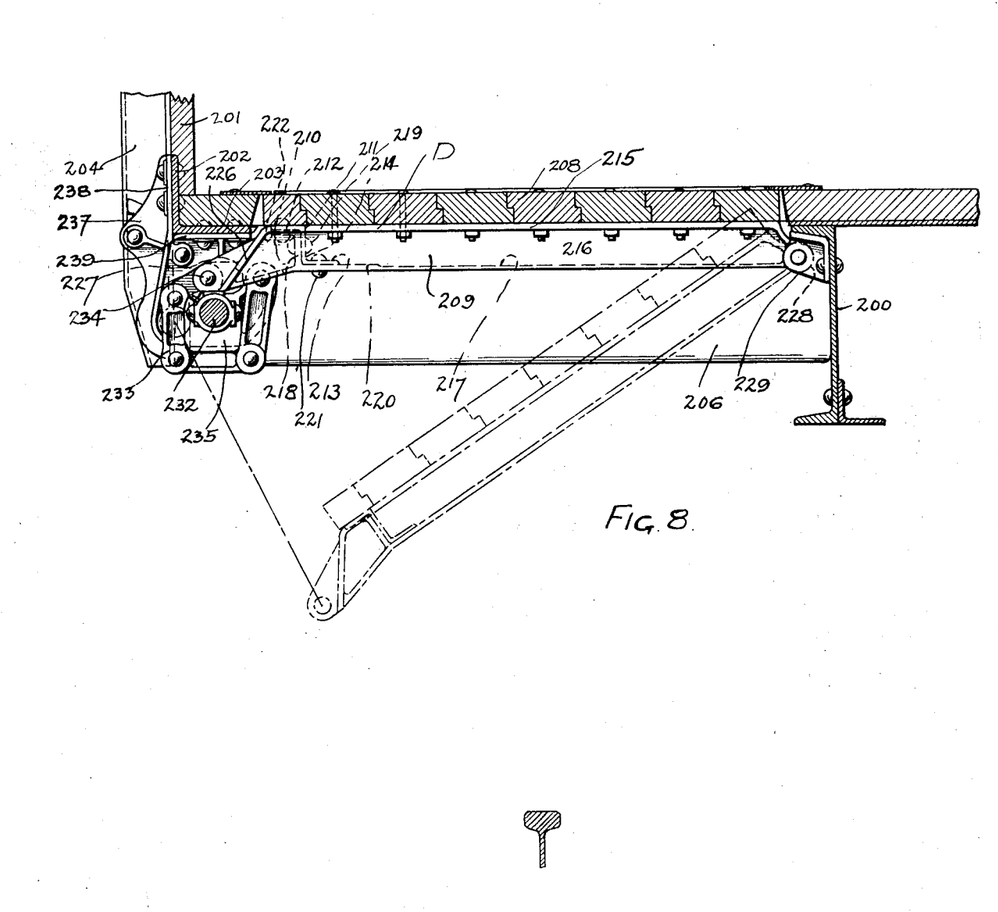
Fig. 8 is a vertical transverse elevational view taken on a line 8—8 of Fig. 6.

In the modification shown in Figs. 6 to 8 inclusive, my improvements are shown as applied to a car of the composite type wherein side framing members are utilized for carrying a portion of the load. In said structure the centersill is indicated at 200 and the side wall at 201, said wall being provided with a lower chord member having an upstanding flange 202 and an outstanding horizontal flange 203. The car side framing includes vertical stakes 204 and diagonal braces 205, said stakes and braces being extended downwardly below the outstanding flange 203 of the lower chord member. Extending transversely between the centersill and the side stake members are the cross beam members 206, said cross beams at the outer end being united with the side stakes and braces by rivets 207. The door D is of the composite type including floor boards 208 and an underbracing for the door including a pair of integral hinge members 209—209, said members adjacent the front margin of the door being each formed with a lateral bracket extension 210, which extensions on the respective beams extend towards each other and are secured to a front marginal reinforcing member 211, the latter being preferably of Z-shape with one flange 212 secured to the under side of the door, and with the other flange 213 turned inwardly away from the free edge of the door in a direction towards the centersill and spaced an appreciable distance from the door, and with the web 214 extending substantially normal to the main plane of the door. The main portion of each beam 209 includes a flange portion 215 underlying and secured to the door boards, and an outstanding depending web portion 216, said web portion 216 being reinforced at its lower margin by an outstanding flange 217. The said flanges 215 and 217 cooperate with the web 216 to form a Z-shaped section. The lateral extension 210 which extends from said web portion 216 includes a web-like portion 218 corresponding in depth to the depth of the web 216 and which overlies and is secured to the web 214 of the front marginal member 211 by means of the two rivets 219. The lateral extension 210 is braced on its under side by a triangular shaped integral gusset-like portion 220 which extends beneath and is secured to the lower flange 213 of member 211 by a rivet 221. The bracket portion 210 is further connected to the front marginal beam member 211 by a wall 222 which underlies and is secured to the upper flange 212 of the front marginal member 211 by a rivet 223.

Each hinge beam 209 is extended beyond the free edge of the door in the form of a pair of walls 224—224 which are spaced an appreciable distance from each other to receive a door connection therebetween. The pairs of walls are spaced lengthwise of the door inwardly of the hinge portions 228. One of said walls 224 is integrally connected with the main web 209 by means of a wall 225 which extends at an angle to said web 209, and said walls 224 are integrally braced to the respective upper and lower flanges 215 and 217 by downwardly extending walls 226 and 227, the latter of which lie between the pair of walls 224—224. The rear portion of the beam is extended outwardly beyond the rear edge of the door and formed with a hinge portion 228 adapted to cooperate with hingebutt brackets 229, the latter being carried by the centersill. The underframing of the door is completed by an angularly shaped brace member 230 which extends centrally of the door from the front door beam 211 to the rear edge of the door, and is there provided with a hinge member 231 the latter being mounted on one of the hingebutt brackets 229.

Cooperable with the extended portion of each beam is a door supporting and raising mechanism including an operating shaft 232 which is connected with the door by means of flexible connections 233, each of said connections having one end extended between the spaced walls 224—224 of the associated door beam and united therewith through pivot 234. The opposite ends of the connection are united to hub members 235 which are rigidly secured to the shaft 232 and have supporting cooperation with the extended portions of the associated hinge beams for maintaining the door in closed position. Adjacent the respective connections the shaft is supported in bearings 236 and 237 respectively, the former disposed rearwardly of the outstanding extended portion of the diagonal brace 205 and secured entirely to the outstanding marginal flange 203 of the lower side wall chord member. The bearing 237 is formed with angularly related walls 238 and 239 respectively secured to the respective walls 202 and 203 of the angular lower chord member. Cooperable with the member 237 and carried thereby is pawl and dog mechanism indicated conventionally at 240 and 241 adapted to have cooperating engagement with ratchet wheel 242 which is fixedly mounted upon the shaft. Cooperable with the under side of the ratchet wheel for rotating the shaft is a lever 243 and associated pawl 244.

Figure 9:
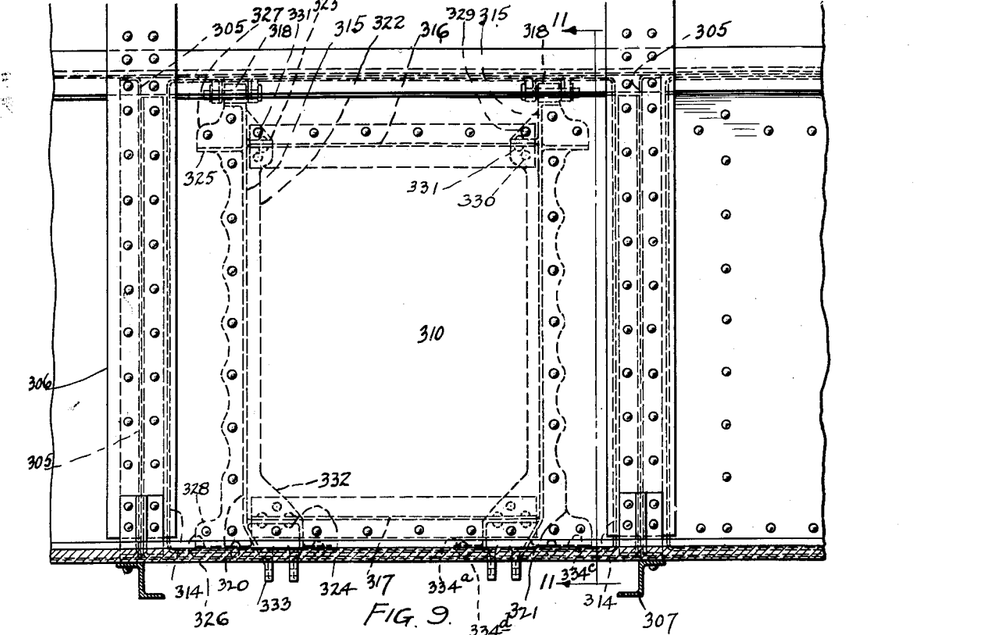
Fig. 9 shows a still further modified embodiment of my invention wherein my improved construction is applied to a car having an extremely large door with a comparatively narrow ledge construction at the side wall of the car, said view illustrating one door and adjacent car construction.
Figure 10:
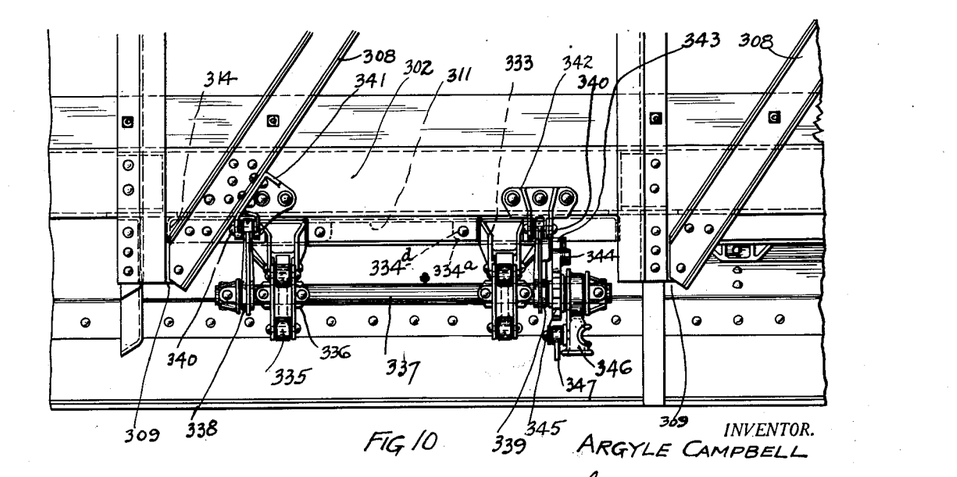
Fig. 10 is a longitudinal vertical elevational view of that portion of the car illustrated in Fig. 9.
Figure 11:
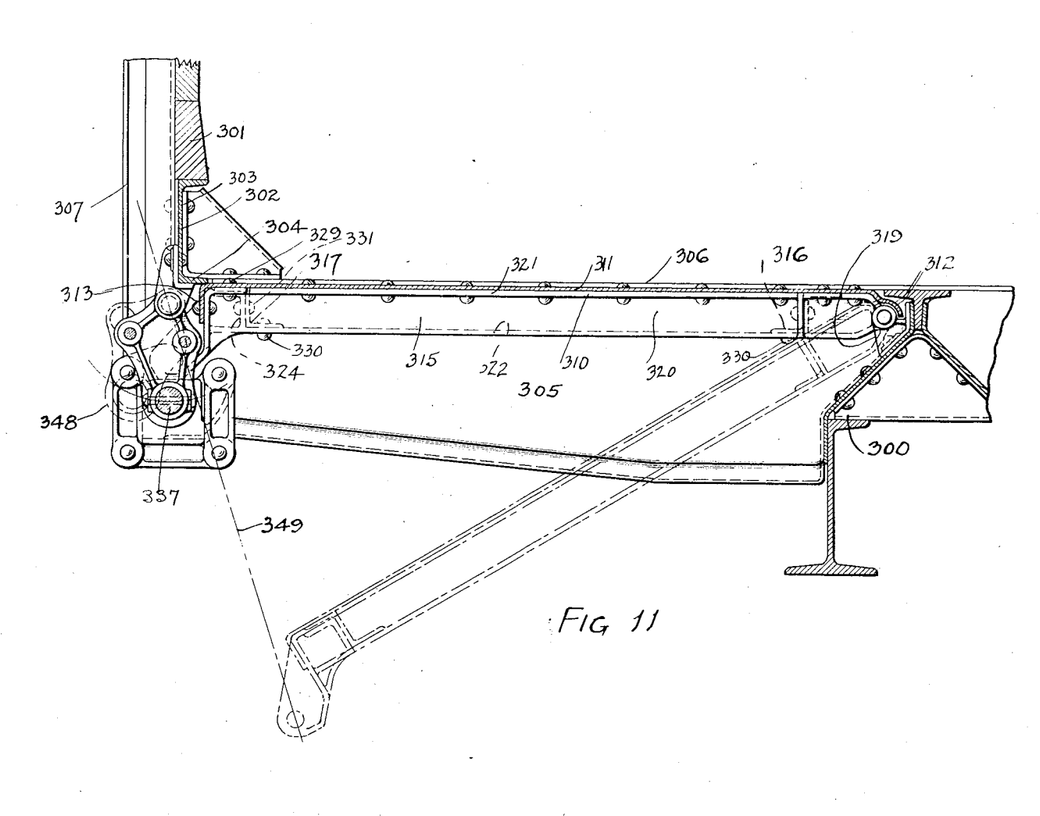
Fig. 11 is a transverse vertical elevational view on an enlarged scale taken on a line 11—11 of Fig. 9.

In the modification shown in Figs. 9 to 11 inclusive, my improvements are shown as applied to a car having a comparatively narrow ledge portion for the lower portion of the car side. In said construction the centersill structure is indicated at 300, the car side wall at 301. The wall 301 includes a lower marginal member 302 having an upstanding web section 303 and an inwardly directed lower marginal flange 304, said last named being of comparatively narrow construction. Extending from the centersill to the side wall of the car are a pair of cross beam members 305—305 which are spaced from each other lengthwise of the car and each beam united with the side wall of the car by a top cover plate 306 and vertical stake members 307. The side wall and cross beam members are further connected by diagonal braces 308 of the usual construction, a connection between the side stakes and cross beams being effected by means of a vertical gusset member 309. The door 310 is shown as formed of a sheet metal plate having body section 311 and a marginal reinforcement at the rear, front and respective side edges thereof, as indicated at 312, 313 and 314—314 respectively.

The under side of the door is reinforced by a framework including a pair of integral hinge bracing members 315—315 in cooperation with front and rear marginal reinforcing members indicated at 316 and 317 respectively, said last named members being of Z-shape. The beam members 315 adjacent the rear edge of the door are each formed with an integral hinge portion 318 whereby the door is pivotally mounted on hingebutt brackets 319, the latter being carried by the centersill of the car. Each said beam member 315 is preferably formed of Z-shape with the web 320 extending substantially at right angles to the main plane of the door and having one flange 321 secured to the body of the door by rivets and the other flange 322 extending in the opposite direction and spaced away from the door. Each beam member adjacent the respective rear and front edges of the door is formed with inwardly extending lateral bracket portions 323 and 324 adapted to be secured to the respective rear and front reinforcing members 316 and 317.

In this embodiment of my invention the hinge beams are spaced an appreciable distance from the respective side edges of the door and each hinge beam 315 is provided with laterally outwardly extending bracket portions 325 and 326 which operate to brace the unsupported portions of the door beyond the ends of the respective members 316 and 317, said respective bracket portions 325 and 326 being provided with flanged portions 327 and 328 which underlie and are secured to the body of the door.

The inwardly extending lateral portions 323 and 324 are of Z-shape and are disposed outwardly of and overlying the respective Z-shape marginal members 316 and 317 and are secured to the respective flanges and web of the latter by means of rivets as indicated at 329, 330 and 331, said bracket portions in cooperation with the outstanding flange 322 of the hingebeam 315 forming a box shape adapted to receive and support the adjacent ends of the respective front and rear reinforcing members. The front bracket portions 324 of the respective beams are extended lengthwise of the front beam member 317 towards each other for an appreciable distance, each said bracket portion being braced to the lower flange 322 of its hinge member by an integral triangular gusset-like portion 332. Each said front bracket portion is provided with a projecting portion 333 which extends through an opening in the front flange of the door. Said projecting portion is provided on the opposite sides with integral lateral walls indicated at 334$^a$ and 334$^c$ respectively which are united with the front door flange by rivets 334$^d$, said portion 333 of each beam being adapted to cooperate with a door winding and supporting connection 335. Each said connection has one end secured to the projecting portion 333 and the opposite end to a hub portion 336, the latter being rigidly secured to a winding shaft 337. The hub forms a door supporting seat on which the hinge beam is adapted to rest when the door is in closed position. The shaft 337 is extended lengthwise of the door and there are two connections per shaft and door.

Immediately adjacent each of the said supporting connections 335 the shaft rests in pivoted links 338 and 339 respectively, said links being pivotally united with respect to the car structure at 340, on brackets 341 and 342 respectively, the former being carried partly by the diagonal brace connection 308 and the vertical web 302 of the side channel member, and the latter bracket 342 being secured to the web 302 of the side channel and having an angularly related portion extended beneath the flange 304 of the side channel member. The bracket 342 is provided with pawl and dog mechanism indicated conventionally at 343 and 344 respectively, said pawl being adapted to cooperate with ratchet wheel 345, the latter being carried on the shaft and fixedly united thereto. Cooperable with the said ratchet wheel 345 for rotating the shaft is the pivoted lever 346 and an associated pawl 347. The parts, with the door in closed position, are as indicated by full lines in Fig. 11. To release the door the shaft is rotated in a clockwise direction thereby forcing the shaft outwardly together with the links to a position as indicated by conventional dotted lines as at 348. It will be noted that in this connection, as the mechanism is swung to open position, that certain of the parts will move outwardly well beyond the car side, but such movement is only a temporary one, as the weight of the falling door and load will tend to pull the shaft inwardly and bring the parts well within the clearance limits with the door in the open position, the connection and links then assuming the line 349.

Figure 12:
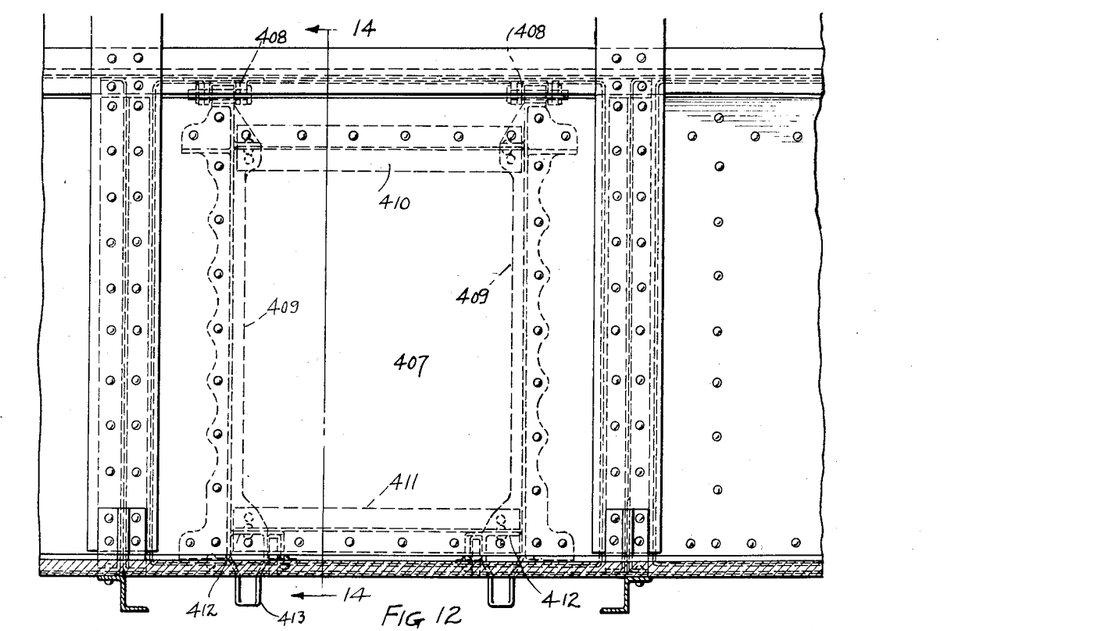
Fig. 12 illustrates a still further modified form of my invention applied to a car of similar construction to that indicated in Figs. 9 to 11, inclusive, but modified therefrom principally in the door operating and supporting mechanism parts, said view illustrating a plan view of one door and adjacent car construction.
Figure 13:
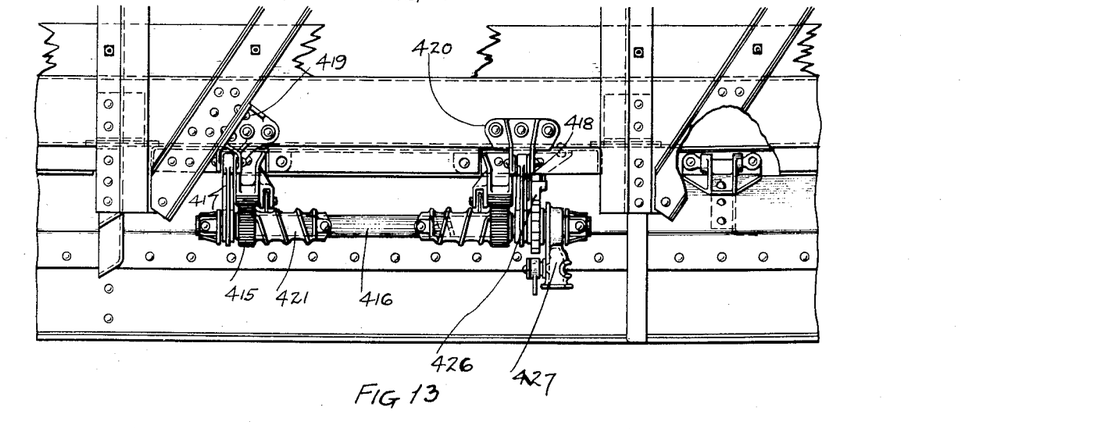
Fig. 13 is a vertical longitudinal elevational view of that portion of the car illustrated in Fig. 12.
Figure 14:
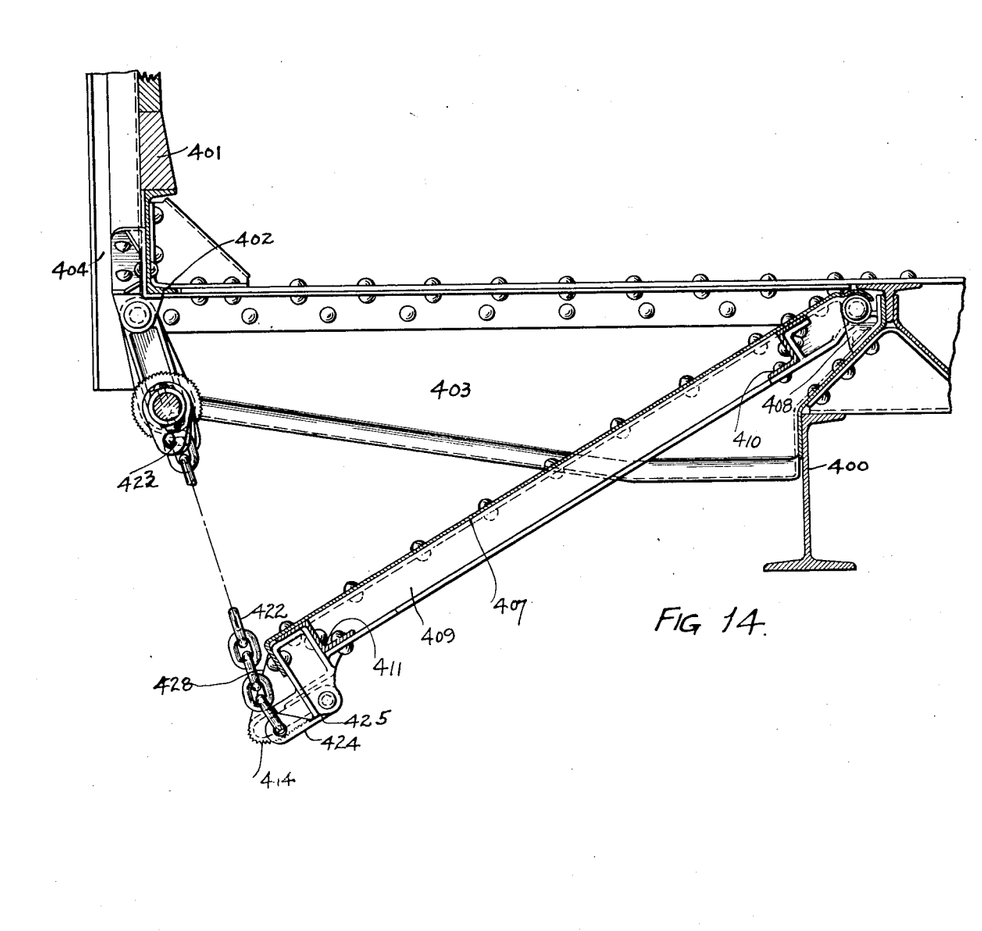
Fig. 14 is a transverse vertical elevational view on an enlarged scale taken on a line 14—14 of Fig. 12, said view illustrating the door in its open position.

In the modification shown in Figs. 12 to 14 inclusive, my improvements are shown as embodied in a car of similar construction with the previous embodiment shown in Figs. 9 to 11 inclusive, but the parts in the door winding and supporting mechanism are modified.

In this embodiment 400 indicates the centersill structure, 401 the car side having an inwardly directed narrow ledge construction 402, a pair of cross beams extending from the centersill to the side of the car as indicated at 403—403, the side stakes at 404 and the diagonal bracing members at 405. The discharge door is indicated at 407, said door being pivotally mounted adjacent the centersill on hinge brackets 408. A pair of integral hinge brace beams of Z-shape are indicated at 409—409, these beams adjacent the rear and front edge of the door cooperating with angularly related bracing means indicated at 410 and 411 respectively. Each beam is provided with an inwardly directed bracket portion 412 having a forwardly projecting portion 413, the latter having a serrated rounded under surface 414 adapted for cooperation with a serrated surface 415 disposed in alignment therewith and carried by an associated operating shaft 416. The operating shaft is pivotally supported in pivotally mounted links 417 and 418 respectively, the said links in turn being pivotally mounted on brackets indicated at 419 and 420 respectively, carried by the car side. Each said serrated surface 415 has associated therewith a winding drum 421 around which a flexible winding connection or chain 422 is adapted to wind, said connection being secured at one end 423 to the winding drum and having at its other end a connection with the door through the medium of a terminal link 424. The link 424 is disposed immediately adjacent the serrated bearing seat 414 and has one end extended within an opening defined on one side by a depending wall 425 and on the opposite side by one of the walls of projecting portion 413.

Shaft locking mechanism associated with link 418 is indicated at 426 and means for rotating the shaft at 427. As will be noted by reference to the position of the door in Fig. 14, the door in its open position draws the shaft inwardly and provides for maximum door opening with a given length of operating connection. During the raising of the door fouling between the door and shaft is positively guarded against by the inclined surface provided by wall 428 which extends from a position immediately adjacent the upper portion of the free edge of the door and which inclines downwardly to the surface of the serrated portion 414.

I claim:

1. In a movable discharge door adapted to be pivotally mounted adjacent one edge thereof, the combination of supporting means adjacent the opposite edge of the door; means adapted to bridge as a unitary structure the distance between said supports and the pivotal mounting, said means including a hinge beam of substantially Z-shape having a flange section underlying the door and secured thereto and having the other flange spaced away from the door with the web of the Z extending substantially normal to the plane of the door; a beam extending adjacent the free edge of the door in angular relation with respect to said hinge beam, said beam being of substantially Z-shape with one flange secured to the door and having the adjacent flange extended into overlapping relation and above the spaced flange of the Z-shaped hinge beam and secured thereto.

2. In a load discharging car door adapted to be suported by movable door supporting means adjacent the opposite ends thereof; a beam extending from the door supporting means to a location immediately adjacent the pivotal support; a reinforcing marginal flange adjacent the front marginal edge of the door, said flange being formed with a cut-away portion through which said beam extends, said beam including in an integral unit means adapted to receive the hinge pivot and at the opposite end of the beam having a pair of spaced jaws within which a door operating mechanism is adapted to extend; and integral lateral bracket means formed on the said beam adjacent the opposite ends thereof, said bracket means being adapted to connect with other reinforcing means extending laterally of the said beam.

3. In a car door of the character described adapted to be pivotally supported adjacent its rear edge, the combination of means for supporting the free edge of said door and for operating said door about its pivotal axis; beams extending parallel with the pivotal axis of the door adjacent the front and rear edges of the door; and a pair of beams extending from the pivotal support of the door to the door operating means, said last named pair of beams being disposed beyond the ends of the first named parallel beams and having integral bracket portions extending around the said parallel beams and secured thereto to provide a complete framework around the four edges of the door.

4. In a load discharging car door adapted to be pivotally supported adjacent one edge thereof and supported by movable door supporting means at its opposite edge, the combination of a pair of integral beam members adapted to bridge the space intermediate the pivotal support and the movable door supporting means; and other beams extending between said integral beams and adapted to complete therewith a self-contained frame structure, said integral beams having integral portions extending laterally therefrom and united with said other beams, said integral beams being also spaced appreciably from the adjacent side edges of the door and formed with integral lateral bracket portions extending towards the side edges of the door for bracing the unsupported edge portions of the door.

5. In a load discharging car door of the type adapted to be pivotally mounted on the car structure at one end and movably supported at its opposite end, the combination of a depending marginal flange adjacent the said opposite end of the door; a reinforcing member disposed inwardly of said marginal flange and substantially parallel thereto; a pair of integral hinge members extending from the door pivotal mounting to the door supporting means, each said hinge member having integral flange means secured to said depending flange and being each provided with a lateral integral bracket portion extending into overlying relation with the reinforcing member and secured thereto.

6. In a load discharging car door of the type to be pivotally supported adjacent one end and having the free edge thereof adapted to be supported by movable door supporting means, the combination of a pair of hinge beams extending from the door pivotal support to the door supporting means, said beams being spaced apart and located adjacent the respective side edges of the door; a beam extending lengthwise of the door adjacent the free edge thereof and between the pair of hinge beams; and integral bracket portions formed on the hinge beams adapted to connect with the said lengthwise beam, said bracket portions including a portion extending beneath the said lengthwise beam and at the side thereof to provide a two-way connection.

7. In a load discharging car door, the combination with a pair of integral hinge beams extending from one edge of the door to the other; of other beams extending transversely of the first named beams and between the same, said beams being of Z-shape with the web substantially normal to the plane of the door and with one flange secured to the underside of the door and the other flange spaced from the main body of the door; and wall means formed integrally with the hinge beams and adapted to extend into the plane of the Z-shape beams, said wall means conforming to the shape of the Z-shape beams and secured to the opposite flanges and web of the same.

8. In a railway car door adapted to be pivotally mounted adjacent one end and movably supported at the opposite end, the combination of an integral hinge beam having a main body portion extending between pivotal mounting and said support and adjacent the front edge of the door having a laterally extending portion substantially parallel to the front edge of the door, said lateral extension being disposed in substantially the same plane as the hinge beam and adapted to overlie and be secured to an adjacent beam member; and an integral portion projecting from said lateral extension, said last named portion being adapted to be engaged by door supporting means.

9. As an article of manufacture, a hinge beam member for a pivotally mounted door, said beam including a body section of substantially Z-shape with one flange adapted to be secured to the door, and the web depending from the main body of the door and having the opposite flange spaced from the door, said beam on the side of said securing flange having an integral hinge eye portion formed therein, said beam on the opposite side of the hinge eye having adjacent the outer end of the door a laterally extending integral bracket portion for attachment to an associated reinforcing member, said bracket being integrally braced to the spaced flange of the hinge beam by a gusset like portion forming substantially a continuation of said spaced flange.

10. In a load discharging door, an article of manufacture comprising an integral beam member extending from one side of the door to the other and provided at one end with means adapted to receive a hinge pivot and provided at the opposite end with a portion extending beyond the door, said last named portion including a pair of jaws spaced apart for receiving a door connection, said beams adjacent the rear edge of the door including a single depending web section and adjacent the front edge of the door being formed of a double web section, said respective double web sections being disposed substantially in alignment with the projecting spaced jaws, said single web and double web sections being integrally united by connecting wall portions extending at an angle to the said respective single and double web sections.

ARGYLE CAMPBELL.